United States Patent
Liu et al.

(10) Patent No.: US 10,355,897 B2
(45) Date of Patent: Jul. 16, 2019

(54) METHOD AND APPARATUS FOR TRANSMISSION OF UPLINK CONTROL INFORMATION

(71) Applicant: Telefonaktiebolaget LM Ericsson (publ), Stockholm (SE)

(72) Inventors: Jinhua Liu, Beijing (CN); Shaohua Li, Beijing (CN); Xinghua Song, Beijing (CN); Daniel Larsson, Stockholm (SE); Yu Yang, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/541,209

(22) PCT Filed: Jan. 28, 2016

(86) PCT No.: PCT/SE2016/050054
§ 371 (c)(1),
(2) Date: Jun. 30, 2017

(87) PCT Pub. No.: WO2016/122386
PCT Pub. Date: Aug. 4, 2016

(65) Prior Publication Data
US 2018/0262377 A1   Sep. 13, 2018

(30) Foreign Application Priority Data
Jan. 30, 2015   (WO) ................ PCT/CN2015/071919

(51) Int. Cl.
*H04L 27/26* (2006.01)
*H04L 1/00* (2006.01)
(Continued)

(52) U.S. Cl.
CPC ........ *H04L 27/2602* (2013.01); *H04L 1/0026* (2013.01); *H04L 1/1854* (2013.01);
(Continued)

(58) Field of Classification Search
CPC . H04L 27/2602; H04L 5/0055; H04L 1/0026; H04L 5/0057; H04L 5/0005;
(Continued)

(56) References Cited

U.S. PATENT DOCUMENTS

2011/0268045 A1* 11/2011 Heo .................. H04L 1/0027
                                                                    370/329
2011/0274043 A1* 11/2011 Nam .................. H04L 5/001
                                                                    370/328
(Continued)

FOREIGN PATENT DOCUMENTS

WO   2010082877 A1   7/2010

OTHER PUBLICATIONS

PCT International Search Report for International application No. PCT/SE2016/050054—dated Aug. 2, 2016.
(Continued)

*Primary Examiner* — Kenneth T Lam
(74) *Attorney, Agent, or Firm* — Sage Patent Group (57) ABSTRACT

The present disclosure provides a method for transmission of uplink control information, UCI, over a physical uplink shared channels, PUSCHs. The method comprising: determining a minimum number of physical resource blocks, PRBs, required for transmission of the UCI, based on the number of downlink component carriers, DL CCs; and scheduling at least the minimum number of PRBs for an uplink component carrier, UL CC, to transmit the UCI. The present disclosure also provides a network node for implementing the same.

2 Claims, 7 Drawing Sheets

(51) Int. Cl.
*H04L 1/18* (2006.01)
*H04L 5/00* (2006.01)
*H04W 72/04* (2009.01)
*H04W 72/12* (2009.01)

(52) U.S. Cl.
CPC .......... *H04L 5/0005* (2013.01); *H04L 5/0055* (2013.01); *H04L 5/0057* (2013.01); *H04L 27/2601* (2013.01); *H04W 72/0413* (2013.01); *H04W 72/1242* (2013.01)

(58) Field of Classification Search
CPC ............. H04L 1/1854; H04L 27/2601; H04W 72/1242; H04W 72/0413
See application file for complete search history.

(56) References Cited

U.S. PATENT DOCUMENTS

| | | | | |
|---|---|---|---|---|
| 2011/0299484 | A1* | 12/2011 | Nam | ..................... H04L 1/0025 370/329 |
| 2011/0310986 | A1* | 12/2011 | Heo | ........................ H04L 5/001 375/259 |
| 2013/0077465 | A1 | 3/2013 | Sasaki et al. | |
| 2013/0208633 | A1* | 8/2013 | Gao | ....................... H04L 1/1861 370/280 |
| 2013/0250886 | A1* | 9/2013 | Zhou | ..................... H04L 1/0026 370/329 |

OTHER PUBLICATIONS

PCT Written Opinion of the International Searching Authority for International application No. PCT/SE2016/050054—dated Aug. 2, 2016.
3GPP TSG RAN WG1 Meeting #63; Jacksonville, USA; Source: ZTE; Title: Remaining Issues for UCI Multiplexing on PUSCH with MIMO Transmission (R1-105963)—Nov. 15-19, 2010.
3GPP TSG RAN WG1 Meeting #63bis; Dublin, Ireland; Source: CATT; Clarification on resource size of UCI in PUSCH (R1-110052)—Jan. 17-21, 2011
3GPP TSG RAN WG1 Meeting #82; Beijing, China; Source: CATT; Title: Aperiodic CSI feedback for up to 32 CCs (R1-153915)—Aug. 24-28, 2015.
European Office Action dated Jan. 28, 2019 for European Patent Application No. 16705848.6, 5 pages.

* cited by examiner

METHOD AND APPARATUS FOR TRANSMISSION OF UPLINK CONTROL INFORMATION

PRIORITY

This nonprovisional application is a U.S. National Stage Filing under 35 U.S.C. § 371 of International Patent Application Serial No. PCT/SE2016/050054 filed Jan. 28, 2016, and entitled "Method and Apparatus for Transmission of Uplink Control Information" which claims priority to International Patent Application Serial No. PCT/CN2015/071919 filed Jan. 30, 2015, all of which are hereby incorporated by reference in their entirety.

TECHNICAL FIELD

The present disclosure generally relates to the technical field of wireless communications, and particularly to method and apparatus for transmission of uplink control information (UCI) over physical uplink shared channels (PUSCHs).

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently in 3GPP, one work item (WI) 'Further enhancement of Carrier Aggregation (FeCA)' is in progress. It is possible to aggregate up to 32 Component Carriers (CC), including both licensed carriers and unlicensed carriers. One important part of this work item is to design and improve the control channels including Downlink Control Information (DCI) and Uplink Control Information (UCI) and possibly some other control channels.

When UCI is to be transmitted in a subframe in which the UE has been allocated transmission resources for the PUSCH, the UCI is multiplexed together with the UL-SCH data prior to DFT spreading, in order to preserve the low CM single-carrier property. The PUCCH is never transmitted in the same subframe as the PUSCH in Releases 8 and 9. The multiplexing of CQI/PMI, HARQ ACK/NACK, and RI with the PUSCH data symbols onto uplink resource elements (REs) is shown in FIG. 1.

The number of REs used for each of CQI/PMI, ACK/NACK and RI is based on the MCS assigned for PUSCH and offset parameters, $\beta_{offset}^{CQI}$, $\beta_{offset}^{RI}$, $\beta_{offset}^{HARQ-ACK}$, which are semi-statically configured by higher-layer signaling.

Figure 1:
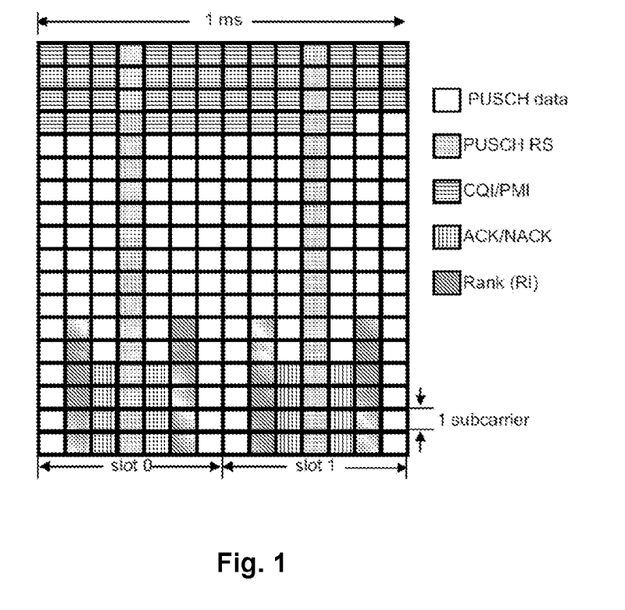
FIG. 1 is an illustration showing an example of multiplexing of control signalling with UL-SCH data.

As shown in FIG. 1, CQI/PMI resources are placed at the beginning of the UL-SCH data resources and mapped sequentially to all SC-FDMA symbols on one subcarrier before continuing on the next subcarrier. The UL-SCH data is rate-matched around the CQI/PMI data. The same modulation order as UL-SCH data on PUSCH is used for CQI/PMI. For small CQI and/or PMI report sizes up to 11 bits, a (32, k) block code, similar to the one used for PUCCH, is used, with optional circular repetition of encoded data (see 3GPP 36.212). No Cyclic Redundancy Check (CRC) is applied. For large CSI reports (>11 bits), an 8-bit CRC is attached and channel coding and rate matching is performed using the tail-biting convolutional code. The HARQ ACK/NACK resources are mapped to SC-FDMA symbols by puncturing the UL-SCH PUSCH data. Positions next to the RS are used, so as to benefit from the best possible channel estimation. The maximum amount of resource for HARQ ACK/NACK is 4SC-FDMA symbols. The coded RI symbols are placed next to the HARQ ACK/NACK symbol positions irrespective of whether ACK/NACK is actually present in a given subframe. The modulation of the 1- or 2-bit ACK/NACK or RI is such that the Euclidean distance of the modulation symbols carrying ACK/NACK and RI is maximized. The outermost constellation points of the higher-order 16/64-QAM PUSCH modulations are used, resulting in increased transmit power for ACK/NACK/RI relative to the average PUSCH data power. The coding of the RI and CQI/PMI are separate, with the UL-SCH data being rate-matched around the RI REs similarly to the case of CQI/PMI.

According to the current 3GPP standard which supports up to 5 DL CCs, the UCI can be transmitted over the UL SCH. In 3GPP 36.213 c40, feedback cell for UCI is specified. If the UE is configured with more than one serving cell and is not configured for simultaneous PUSCH and PUCCH transmission, then in Subframe n UCI shall be transmitted

- on PUCCH using format 1/1a/1b/3 or 2/2a/2b if the UE is not transmitting PUSCH;
- on PUSCH of the serving cell if the UCI consists of aperiodic CSI or aperiodic CSI and HARQ-ACK;
- on primary cell PUSCH if the UCI consists of periodic CSI and/or HARQ-ACK and if the UE is transmitting on the primary cell PUSCH in subframe n unless the primary cell PUSCH transmission corresponds to a Random Access Response Grant or a retransmission of the same transport block as part of the contention based random access procedure, in which case UCI is not transmitted;
- on PUSCH of the secondary cell with smallest cell index if the UCI consists of periodic CSI and/or HARQ-ACK and if the UE is not transmitting PUSCH on primary cell but is transmitting PUSCH on at least one secondary cell.

In any specified case, the UCI transmission over more than one UL CC is not allowed for the aggregated cells.

For up to 5 DL CCs in the current specification, there are up to 10 HARQ ACKs bits for FDD at one time. For TDD, the number of HARQ feedback bits depends on the UL/DL configuration. Take UL/DL configuration 2 as one example, the total required bits HARQ ACK NACK bits are 40 bits for 5 DL CCs. In TDD case, HARQ ACK/NACK bundling may be applied between two code words. For FDD, assume 1/2 coding and QPSK modulation is applied, there are 10 symbols (i.e. RE) needed at least.

For up to 32 DL CCs, there are up to 64 HARQ ACKs at one time (Rank 2 transmission) depending on the number of configured DL CCs for FDD. For TDD, the number of HARQ-ACK bits to be feedback depends on the number of configured CCs and UL/DL subframe configuration of the DL CCs. Assume there are 32 DL CCs with UL/DL subframe configuration 2 and transmission mode 3, there are up to 256 (32*4*2) HARQ ACK/NACK bits. Assume 1/2 coding rate and QPSK modulation are applied, FDD needs 32 REs at least while TDD needs 256 symbols (32 symbols for FDD and 128 symbols for TDD respectively if the bundling is applied between two codewords) at least.

Considering the case that the UCI is only carried over the UL-SCH channel, when there are 32 DL CCs with UL/DL subframe configuration 2 for TDD systems, there can be up to 256/128 symbols (32 DL CC, UL/DL configuration 2, 1/2 coding and QPSK modulation) with/without bundling between two codewords for HARQ QCK/NACK feedback. However, one PRB can at most carry 48 (4 symbol×12 subcarrier) symbols. Considering the 1% error target for HARQ ACK/NACK detection, more symbols may be required for HARQ ACK/NACK carrying by configuring the mentioned parameters (e.g. $\beta_{offset}^{HARQ-ACK}$). There may be no enough room for HARQ-ACK/NACK feedback when the number of scheduled PRBs over the UL CC for HARQ ACK/NACK bits is too small while the number of the scheduled DL CCs is large. For instance, the available REs are not enough to carry the HARQ ACK/NACK bits if one UL CC is scheduled with one or two PRBs while 32 DL CCs are scheduled. Similarly RI and CSI feedback also need more resources.

SUMMARY

In view of the foregoing, an object of the present disclosure is to overcome at least one of the above-described drawbacks of the existing solutions.

To achieve this object, the present disclosure proposes to schedule enough PRBs over the UL CC for UCI carrying. The minimum number (X) of PRBs required for UCI feedback is determined and at least X PRBs are scheduled for UL SCH in order to provide enough capacity to carry UCI. If there are multiple UL CCs scheduled for one UE, one UL CC with enough capacity to carrier is selected according to preconfigured rules, or the UCI are mapped over multiple UL SCHs according to the preconfigured rules. The present disclosure further proposes processing HARQ ACK/NACK bundling between DL CCs when there is no enough room for HARQ ACK/NACK carrying over one UL SCH.

According to an aspect of the present disclosure, there is provided a method for transmission of uplink control information (UCI) over a physical uplink shared channels (PUSCH). The method comprises determining a minimum number of physical resource blocks (PRBs) required for transmission of the UCI based on the number of downlink component carriers (DL CCs), and scheduling at least the minimum number of PRBs for an uplink component carrier (UL CC) to transmit the UCI.

In some embodiments, a desired code rate for UCI bits is determined based on channel quality and a certain block error rate (BLER) target, and the minimum number of PRBs required for transmission of the UCI is determined based on the number of UCI bits and the desired code rate for UCI bits.

In some embodiments, a further number of PRBs for data transmission over the UL CC are determined. If the further number is not smaller than the minimum number, the further number of PRBs for the UL CC are scheduled; otherwise, the minimum number of PRBs for the UL CC are scheduled.

According to another aspect of the present disclosure, there is provided a method for transmission of uplink control information (UCI) over a physical uplink shared channels (PUSCH). The method comprises determining two numbers, the first number being dependent on data traffic and the second number being dependent on the UCI, and scheduling the larger one of the first and second numbers of PRBs for transmitting the UCI if the UCI contains periodic channel state information (CSI) and the PUSCH is scheduled by semi-persistent scheduling, or scheduling the first number of PRBs for transmitting the UCI if the UCI does not contain the periodic CSI.

According to another aspect of the present disclosure, there is provided a method for transmission of uplink control information (UCI) over a physical uplink shared channels (PUSCH). The method comprises determining, according to predefined priority descending order of uplink component carriers (UL CCs), the number of coded modulation symbols based on the number of UCI bits and the scheduling decision for PUSCH data on the UL CC, and determining an UL CC for transmission of the UCI, wherein the determined UL CC provides enough capacity to transmit the UCI and the higher priority UL CCs for the determined UL CC cannot provide enough capacity to transmit the UCI.

According to another aspect of the present disclosure, there is provided a method for transmission of uplink control information (UCI) over a physical uplink shared channels (PUSCH). The method comprises determining an UL CC for transmission of the UCI and receiving the UCI transmitted over the determined UL CC, wherein the determined UL CC provides enough capacity to transmit the UCI and the higher priority UL CCs for the determined UL CC cannot provide enough capacity to transmit the UCI.

In some embodiments, more physical resource blocks (PRBs) on an UL CC with higher priority are scheduled. Alternatively, physical resource blocks (PRBs) enough to transmit the UCI on an UL CC with highest priority are scheduled.

According to another aspect of the present disclosure, there is provided a method for transmission of uplink control information (UCI) over a plurality of uplink shared channels (UL SCHs). The method comprises dividing the UCI load among the plurality of UL SCHs, and mapping the divided UCI to physical resource blocks (PRBs) for the plurality of UL SCHs.

In some embodiments, physical resource blocks (PRBs) allocated over different UL CCs are concatenated to be PRBs for a virtual uplink shared channel (UL SCH), and the divided UCI is mapped to the PRBs for the virtual UL SCH.

In some embodiments, the PRBs are concatenated based on at least one of cell index and predefined order.

In some embodiments, when the UCI symbols are carried over a plurality of UL SCHs, the number of symbols for UCI is jointly determined based on parameters from the corresponding uplink component carriers (UL CCs).

According to another aspect of the present disclosure, there is provided a network node for transmission of uplink control information (UCI) over a physical uplink shared channels (PUSCH). The network node comprises a determining unit configured to determine a minimum number of physical resource blocks (PRBs) required for transmission of the UCI, based on the number of downlink component carriers (DL CCs), and a scheduling unit configured to schedule at least the minimum number of PRBs for an uplink component carrier (UL CC) to transmit the UCI.

In some embodiments, the determining unit is configured to determine a desired code rate for UCI bits based on channel quality and a certain block error rate (BLER) target, and determine the minimum number of PRBs required for transmission of the UCI based on the number of UCI bits and the desired code rate for UCI bits.

In some embodiments, the determining unit is configured to determine a further number of PRBs for data transmission over the UL CC, and wherein the scheduling unit is configured to: if the further number is not smaller than the minimum number, schedule the further number of PRBs for the UL CC; otherwise, schedule the minimum number of PRBs for the UL CC.

According to another aspect of the present disclosure, there is provided a network node for transmission of uplink control information (UCI) over a physical uplink shared channels (PUSCH). The network node comprises a determining unit configured to determining two numbers, the first number being dependent on data traffic and the second number being dependent on the UCI, and a scheduling unit configured to schedule the larger one of the first and second numbers of PRBs for transmitting the UCI if the UCI contains periodic channel state information (CSI) and the PUSCH is scheduled by semi-persistent scheduling, or schedule the first number of PRBs for transmitting the UCI if the UCI does not contain the periodic CSI.

According to another aspect of the present disclosure, there is provided a network node for transmission of uplink control information (UCI) over a physical uplink shared channels (PUSCH). The network node comprises a first determining unit configured to determine, according to predefined priority descending order of uplink component carriers (UL CCs), the number of coded modulation symbols based on the number of UCI bits and the scheduling decision for PUSCH data on the UL CC, and a second determining unit configured to determine an UL CC for transmission of the UCI, wherein the determined UL CC provides enough capacity to transmit the UCI and the higher priority UL CCs for the determined UL CC cannot provide enough capacity to transmit the UCI.

According to another aspect of the present disclosure, there is provided a network node for transmission of uplink control information (UCI) over a physical uplink shared channels (PUSCH). The network node comprises a determining unit configured to determine an UL CC for transmission of the UCI and a receiving unit configured to receive the UCI transmitted over the determined UL CC, wherein the determined UL CC provides enough capacity to transmit the UCI and the higher priority UL CCs for the determined UL CC cannot provide enough capacity to transmit the UCI.

In some embodiments, the determining unit is configured to schedule more physical resource blocks (PRBs) on an UL CC with higher priority. Alternatively, the determining unit is configured to schedule physical resource blocks (PRBs) enough to transmit the UCI on an UL CC with highest priority.

According to another aspect of the present disclosure, there is provided a network node for transmission of uplink control information (UCI) over a plurality of uplink shared channels (UL SCHs). The network node comprises a dividing unit configured to divide the UCI load among the plurality of UL SCHs and a mapping unit configured to map the divided UCI to physical resource blocks (PRBs) for the plurality of UL SCHs.

In some embodiments, the dividing unit is configured to concatenate physical resource blocks (PRBs) allocated over different UL CCs to be PRBs for a virtual uplink shared channel (UL SCH), and the mapping unit is configured to map the divided UCI to the PRBs for the virtual UL SCH.

In some embodiments, the dividing unit is configured to concatenate the PRBs based on at least one of cell index and predefined order.

In some embodiments, when the UCI symbols are carried over a plurality of UL SCHs, the number of symbols for UCI is jointly determined based on parameters from the corresponding uplink component carriers (UL CCs).

BRIEF DESCRIPTION OF THE DRAWINGS

The above and other objects, features, and advantages of the present disclosure will become apparent from the following descriptions on embodiments of the present disclosure with reference to the drawings, in which.

In the drawings, similar or same steps and/or elements are designated with similar or same referential numbers. It is to be noted that not all the steps and/or elements shown in the drawings are necessary for some embodiments of the present disclosure. For simplicity and clarity, those optional steps and/or elements are shown in dashed lines.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "base station", "user equipment", and "network node" as used herein should be understood in a broad sense. Specifically, the base station should be understood to encompass a legacy base station in a $2^{nd}$ Generation (2G) network, a NodeB in a $3^{rd}$ Generation (3G) network, an evolved NodeB (eNode B) in a $4^{th}$ Generation (4G) or future evolved network (e.g., LTE network, LTE-A network etc.), and the like. The user equipment should be understood to encompass a mobile telephone, a smart phone, a wireless-enabled tablet or personal computer, a wireless machine-to-machine unit, and the like. The network node should be understood to encompass a Mobility Management Entity (MME), a Serving GPRS Support Node (SGSN), and the like.

The present disclosure proposes a method for transmission of feedback UCI over PUSCH when there are up to 32 DL CCs, especially HARQ ACK/NACK over UL SCH when there are 32 DL CCs available and the capacity for UCI feedback is not enough. In the next, the embodiments are to be described in detail with HARQ ACK/NACK feedback as an example. One of ordinary skill in the art can appreciate that the principles of the present disclosure is not limited thereto, and can be applied for both HARQ ACK/NACK feedback and CSI feedback in other scenarios.

Scheduling Enough PRBs Over the UL CC to Carry UCI

According to an embodiment of the present disclosure, an eNB may determine the minimum number (X) of PRBs required for UCI feedback according to the number of DL CCs, and schedule at least X PRBs for UL SCH for the UL CC to carry UCI. If there are enough PRBs available over the UL CC, the principles of the present disclosure can be used without modifying the current standardization.

Figure 4:
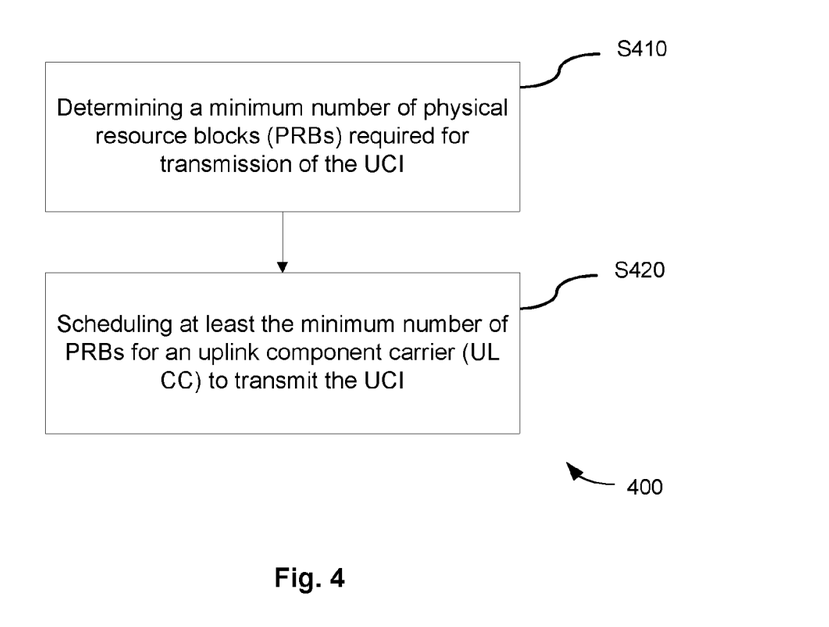
FIG. 4 is a flowchart showing an example method according to an embodiment of the present disclosure.

FIG. 4 is a flowchart showing an example method according to an embodiment of the present disclosure. As shown in FIG. 4, the method 400 comprises steps 410 and 420. This method can be carried out by a network node, such as a base station or an eNodeB, the construction of which being described below with reference to FIG. 8.

At step 410, a minimum number of physical resource blocks (PRBs) required for transmission of the UCI is determined based on the number of downlink component carriers (DL CCs). For example, a desired code rate for UCI bits is determined based on channel quality and a certain block error rate (BLER) target, and the minimum number of PRBs required for transmission of the UCI is determined based on the number of UCI bits and the desired code rate for UCI bits.

At step 420, at least the minimum number of PRBs for an uplink component carrier (UL CC) are scheduled to transmit the UCI. Preferably, a further number of PRBs for data transmission over the UL CC is determined, and if the further number is not smaller than the minimum number, the further number of PRBs for the UL CC are scheduled; otherwise, the minimum number of PRBs for the UL CC are scheduled.

As an example, an eNB first determines the desired code rate for HARQ ACK/NACK carrying based on the channel quality and the 1% BLER target. The eNB then determines, based on the number of HARQ ACK/NACK bits and the desired code rate of HARQ ACK/NACK bits, the number of symbols (i.e. RE) for HARQ ACK carrying and the minimum number (X1) of required PRBs in order to provide enough capacity for HARQ ACK/NACK carrying over the determined UL CC. The eNB further determines the number of PRBs (X2) for data carrying over the UL CC. If X2 is not smaller than X1, the eNB schedules X2 PRBs over the UL CC. If X2 is smaller than X1, the eNB schedules X1 PRBs over the UL CC.

For example, the number of raw HARQ ACK/NACK bits to be carried by uplink subframe i with respect to the number of DL CCs and the number of scheduled DL subframes may be calculated as follows:

$$M_{HARQ-ACK,i} = \sum_{c=0}^{C-1} \sum_{s=0}^{S-1} m_{c,s}$$

Where $M_{HARQ-ACK,i}$ is the total number of HARQ-ACK bits to be carried in uplink subframe i, C is the total number of DL CCs, S is the total number of DL subframes whose corresponding HARQ-ACK bits are to be carried in uplink subframe i, and $m_{c,s}$ is the HARQ ACK bits corresponding to the DL transmission in CC c and the s-th DL subframe. It should be noted the parameter s is the local index of the DL subframes whose HARQ ACK bits are to be carried by uplink subframe i. In addition, the parameter s may be different from the actual subframe index.

For instance, considering the TDD case with 128 HARQ ACK/NACK bits, the number of modulated symbols is also 128 when applying 1/2 code rate and QPSK modulation. The minimum number of PRBs for HARQ ACK/NACK carrying is 3 PRBs (3*4*12=144 symbols for HARQ ACK/NACK, larger than 128). In this case, the eNB shall schedule at least 3 PRBs. Considering the 1% BLER target of HARQ, much more robust coding for ACK/NACK may be required. If so, the required symbols for HARQ ACK/NACK carrying can be more. If coding rate 1/3 is applied, 128 HARQ ACK/NACK bits can be coded into 192 (128*3/2) symbols, the minimum number of required PRBs for HARQ ACK/NACK carrying is then 4 PRBs. In practice, even lower coding rate for HARQ ACK/NACK may be required in order to conquer the channel variation, e.g. channel fading and interference. In this case, even more UL PRBs shall be scheduled over the UL CC for HARQ ACK/NACK carrying.

Extending PRBs to Accommodate Both Data Bits and Information Bits in Case Semi-Persistent Scheduling is Configured In case semi-persistent scheduling is configured, the resource allocation is decided based on the (e)PDCCH scheduling activation in legacy system. If the above solution is used, the minimum number (X) of PRBs required for UCI feedback is scheduled according to the number of DL CCs across a long time interval. If the minimum number (X) of PRBs required for UCI feedback is far more than the number of PRBs needed for data traffic, it will lead significant capacity loss.

Figure 5:
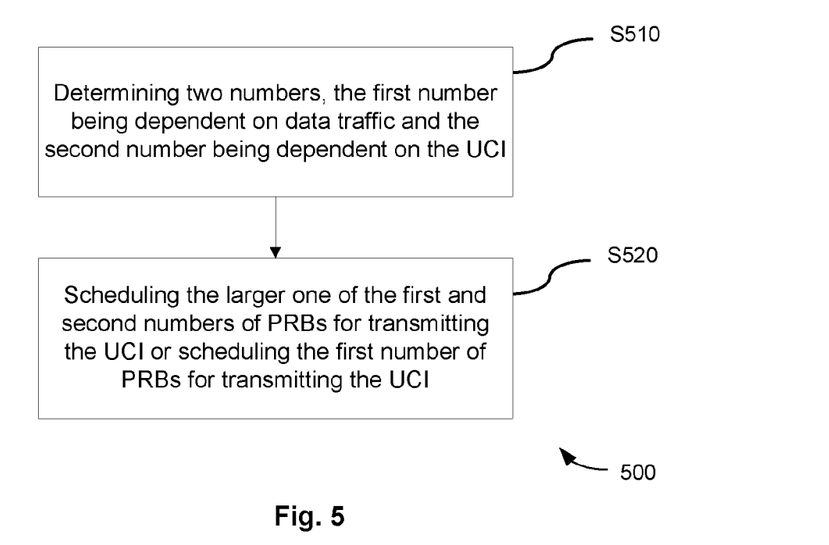
FIG. 5 is a flowchart showing an example method according to an embodiment of the present disclosure.

FIG. 5 is a flowchart showing an example method according to an embodiment of the present disclosure. As shown in FIG. 5, the method 500 comprises steps 510 and 520. This method can be carried out by a network node, such as a base station or an eNodeB, the construction of which being described below with reference to FIG. 8.

At step 510, two numbers are determined. The first number is dependent on data traffic and the second number is dependent on the UCI.

At step 520, the larger one of the first and second numbers of PRBs for transmitting the UCI are scheduled, if the UCI contains periodic channel state information (CSI) and the PUSCH is scheduled by semi-persistent scheduling. Alternatively, the first number of PRBs for transmitting the UCI are scheduled if the UCI does not contain the periodic CSI.

Figure 2:
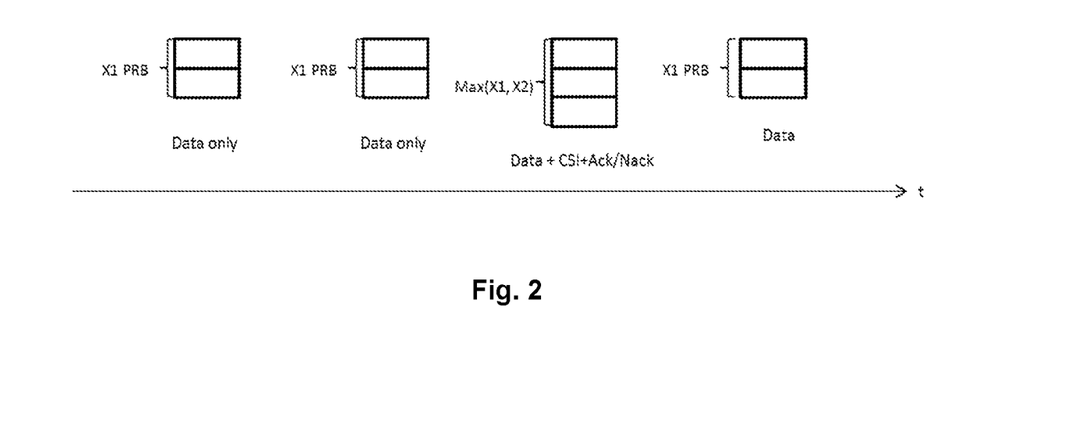
FIG. 2 is an illustration showing an example for the resource allocation for semi-persistent scheduling according to an embodiment of the present disclosure.

According to this embodiment, two PRB numbers (X1, X2) are defined, the first PRB number (X1) is decided based on the data traffic, and the second PRB number (X2) is decided based on the UCI feedback. Max(X1,X2) PRBs will be used for PUSCH transmission if the UCI consists of periodic CSI and/or HARQ-ACK and if the PUSCH is scheduled by semi-persistent scheduling. X1 PRBs will be used for PUSCH transmission if the UCI does not consist of periodic CSI and/or HARQ-ACK. FIG. 2 shows an example for the resource allocation for semi-persistent scheduling according to this embodiment.

HARQ ACK/NACK Carrying when there are Multiple UL CCs

Considering a large feedback load with up to 32 DL CCs, one or more of the following solutions can be applied for UCI over UL SCH in case of multiple UL CCs are scheduled for one UE:

Solution 1: One UL CC with Enough Capacity to Carry UCI is Selected According to Preconfigured Rules One or multiple of the following rules can be applied to select the UL CC for HARQ ACK/NACK carrying in case of multiple UL CCs are scheduled for one UE: it can be predefined or configured to select the first UL CC with enough capacity to carry the HARQ ACK/NACK bits according to the predefined priority descending order of UL CC list for UCI carrying.

Figure 6A:
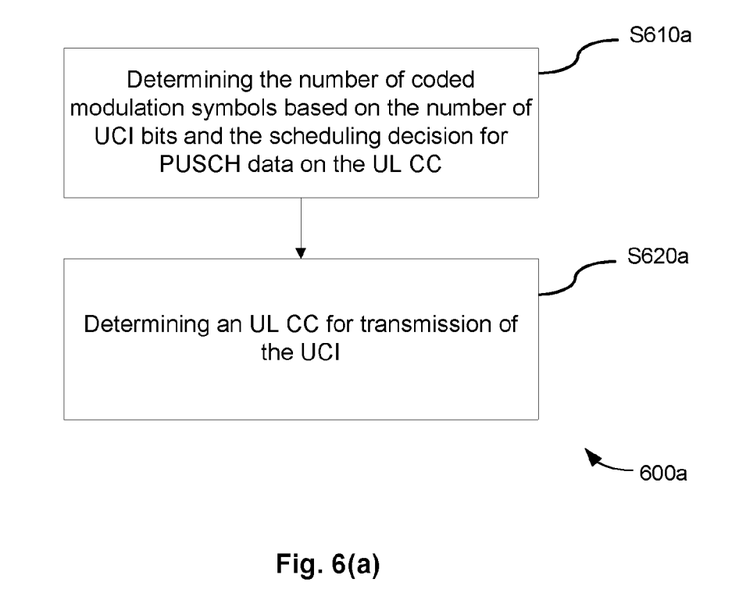
FIGS. 6(a)-6(b) are flowcharts showing example methods according to an embodiment of the present disclosure.

FIG. 6(a) is a flowchart showing an example method according to an embodiment of the present disclosure. As shown in FIG. 6(a), the method 600a comprises steps 610a and 620a. This method 600a can be carried out by a network node, such as a user equipment, the construction of which being described below with reference to FIG. 10.

At step 610a, according to predefined priority descending order of uplink component carriers (UL CCs), the number of coded modulation symbols are determined based on the number of UCI bits and the scheduling decision for PUSCH data on the UL CC.

At step 620a, an UL CC for transmission of the UCI is determined, wherein the determined UL CC provides enough capacity to transmit the UCI and the higher priority UL CCs for the determined UL CC cannot provide enough capacity to transmit the UCI.

For example, according to the predefined priority descending order of UL CC list, an UE may determine the number of coded modulation symbols based on the number of HARQ-ACK bits and the scheduling decision for PUSCH data on the UL CC according to below equation 1. The definition of the parameters in equation 1 can be found in 3GPP TS 36.212. And then the UE determines the required REs for HARQ ACK/NACK on this UL CC.

$$N_{HARQ-ACK} = \left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil \quad \text{Equation 1}$$

Next, the UE determines the UL CC for HARQ ACK/NACK carrying if the UL CC can provide enough capacity and the higher priority UL CCs cannot provide enough capacity. Finally, the UE transmits the HARQ ACK/NACK over the selected UL CC.

Figure 6B:
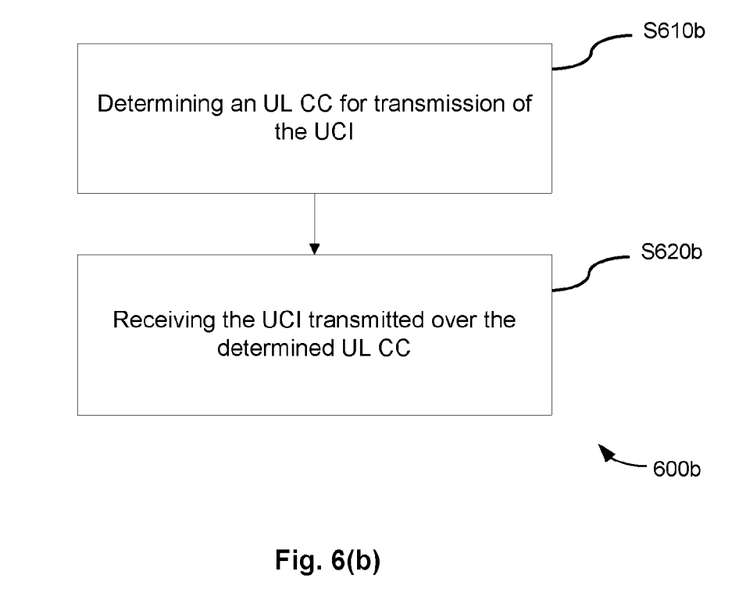

On the other hand, FIG. 6(b) is a flowchart showing another example method according to an embodiment of the present disclosure. At step 610b, an eNB may determine the UL CC according to the same rule as mentioned above with respect to step 620a of FIG. 6(a). Then, at step 620b, the eNB may receive and possibly decode the HARQ ACK/NACK over the determined UL CC.

Alternatively, the eNB can schedule more PRBs on UL CC with higher priority to minimize the efforts of selecting capable UL CC carrying UCI on PUSCH.

Alternatively, the eNB can schedule enough PRBs on UL CC with highest priority which is capable of carrying UCI on PUSCH. The UE transmits UCI on PUSCH on the UL CC with highest priority.

Solution 2: The UCI is Mapped Over Multiple UL SCHs According to the Preconfigured Rules The HARQ ACK/NACK can be mapped to multiple UL SCHs in case there are multiple UL CCs scheduled and the UL CC of highest priority to carry HARQ ACK/NACK cannot provide enough capacity.

Figure 7:
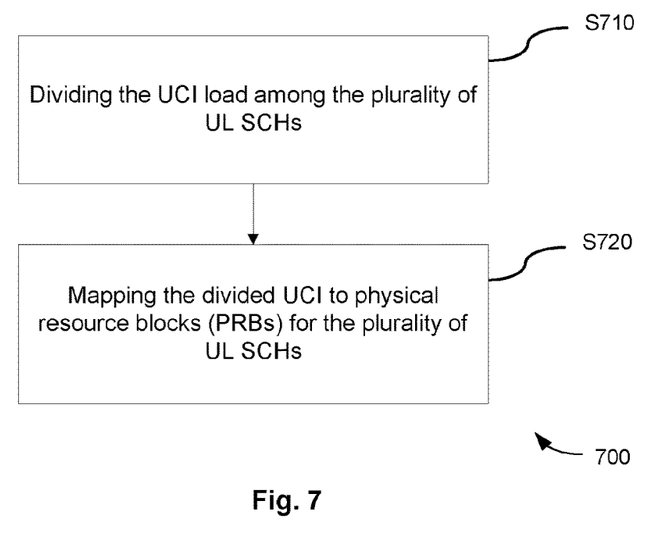
FIG. 7 is a flowchart showing an example method according to an embodiment of the present disclosure.

FIG. 7 is a flowchart showing an example method according to an embodiment of the present disclosure. As shown in FIG. 7, the method 700 comprises steps 710 and 720. This method can be carried out by a network node, such as a user equipment or a base station, the construction of which being described below with reference to FIG. 9.

At step 710, the UCI load can be divided among a plurality of UL SCHs.

At step 720, the divided UCI is mapped to physical resource blocks (PRBs) for the plurality of UL SCHs.

Figure 3:
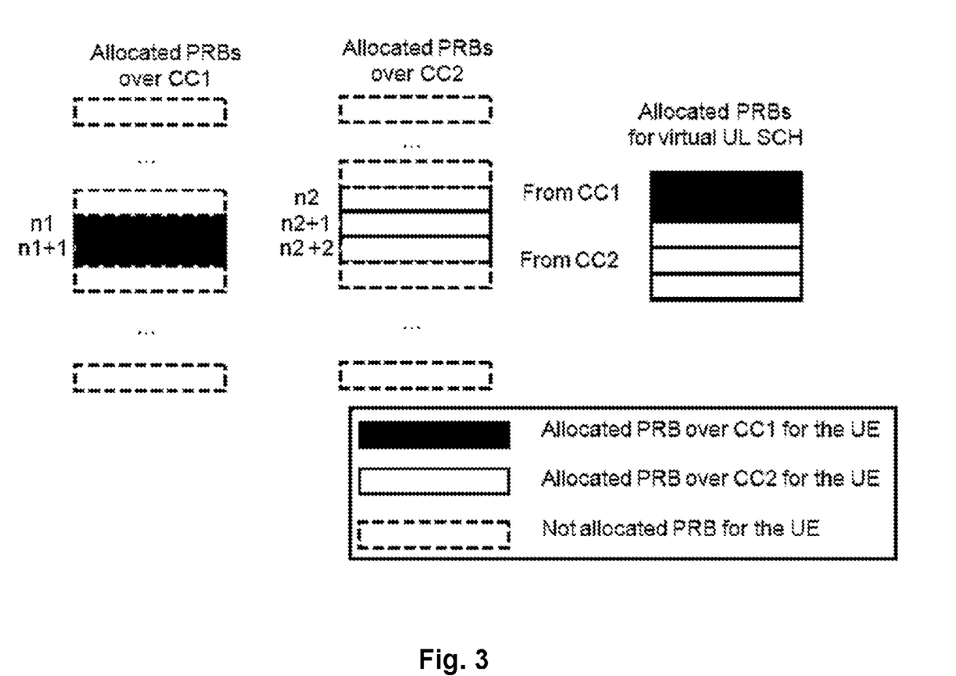
FIG. 3 illustrates an example for constructing a virtual UL SCH with allocated PRBs over two CCs according to an embodiment of the present disclosure.

As one example, the PRBs allocated over different UL CCs can be concatenated to be the PRBs for one UL SCH (referred to as virtual UL SCH). The HARQ ACK/NACK symbols are coded and mapped to the PRBs of the virtual UL SCH in the same way as one UL SCH. FIG. 3 illustrates one example for constructing a virtual UL SCH with allocated PRBs over two CCs.

Alternatively, the PRBs from multiple CCs can be concatenated based on the cell index. The PRBs of a CC with lower cell index can be assigned with lower PRB index in constructing the virtual UL SCH.

Alternatively, the PRBs from multiple CCs can be based on certain predefined order, for instance, the PRBs from primary UL CC is assigned with a lowest PRB index in constructing the virtual UL SCH, and the index of the PRBs from other UL CCs are assigned higher PRB index according to the corresponding cell index ascending order.

Alternatively, the capacity for HARQ ACK/NACK bits is determined by the sum of concatenated PRBs and the symbols are mapped to the PRBs according to the virtual PRB index within the virtual UL SCH.

Alternatively, when the HARQ ACK/NACK bits are carried over multiple UL SCHs, the number of symbols for HARQ ACK/NACK carrying can be jointly determined according to parameters from the corresponding UL CCs. Assume there are two PUSCHs, the following equation 2 can be applied:

$$N_{HARQ-ACK}=f(O, M_{sc}^{PUSCH\ 1\text{-}initial}, M_{sc}^{PUSCH\ 2\text{-}initial}, \beta_{offset}^{PUSCH\ 1}, \beta_{offset}^{PUSCH\ 2}, MCS1, MCS2)$$ Equation 2

Where "1" and "2" denote the first/second UL CC for UCI carrying respectively, and transport block size maybe also one input parameter to replace some parameters in the Equation 2. Two examples are given below.

Example 1 the number of REs for HARQ ACK/NACK carrying over the virtual carrier can be calculated by using Equation 1 with redefined parameters: O is not changed; $M_{sc}^{PUSCH\text{-}initial}$ is the number of subcarriers of the virtual carrier (i.e. $M_{sc}^{PUSCH\text{-}initial}=M_{sc}^{PUSCH\ 1\text{-}initial}+M_{sc}^{PUSCH\ 2\text{-}initial}$); $\beta_{offset}^{PUSCH}$ can be either $\beta_{offset}^{PUSCH\ 2}$ or $\beta_{offset}^{PUSCH\ 1}$ according to predefined rules, e.g. (1) the maximum $\beta_{offset}^{PUSCH}$ is used between two UL CCs; or (2) the $\beta_{offset}^{PUSCH}$ of the UL CC with lower cell index or CC frequency can be applied.

Example 2 the HARQ ACK/NACK bits are divided between two parts (see FIG. 3) of the virtual carrier first and the number of REs for HARQ ACK/NACK bits carrying over each part is calculated separately according to Equation 1. There can be different rules to divide the HARQ ACK/NACK bits between two parts: (1) dividing the HARQ ACK/NACK bits between UL SCHs proportionally to the allocated bandwidth; or (2) dividing the HARQ ACK/NACK bits proportionally to the transport block size.

Alternatively, there can be a limit for PRB concatenation to construct one virtual UL SCH for HARQ ACK/NACK carrying. For instance, the PRBs from at most two UL CCs can be concatenated.

Alternatively, the UCI for some Downlink CCs is associated with the uplink CCs carrying PUSCH. The PUSCH on a specific uplink CC only carries the associated HARQ Ack/Nack for the associated downlink CCs in case the capacity is limited.

HARQ ACK/NACK Bundling

When there is no enough room for HARQ ACK/NACK carry over one UL SCH, it is feasible to process HARQ ACK/NACK bundling between DL CCs. One or more of the following rules can be predefined or configured to perform HARQ ACK/NACK bundling:

The HARQ ACK/NACK bundling is only performed across unlicensed DL CCs; for the licensed DL CCs, no HARQ ACK/NACK bundling across carriers is allowed.

The HARQ ACK/NACK bundling is only performed across secondary DL CCs, while the HARQ ACK/NACK bits of the primary DL CC shall not be bundled with that of any secondary DL CCs.

For HARQ ACK/NACK bundling, the HARQ ACK/NACK bits between the adjacent DL CCs can be bundled. The reason is that: because WiFi may use 20, 40, 80 and 160 MHz channels, there is certain probability that the adjacent carrier experiences similar interference from adjacent WiFi node and the detection error might be correlated somehow.

The HARQ ACK/NACK bundling is only performed across DL CCs belonging to one band. Cross-band bundling could be prohibited or avoided based on predefined rules or configuration by the eNB.

The HARQ ACK/NACK bundling across DL CCs is of lower priority than other bundlings such as spatial bundling and a bundling between neighboring TTIs over the same carrier, i.e. the HARQ ACK/NACK bundling across DL CCs is performed only when there is still no enough room for HARQ ACK/NACK carrying after the bundling between spatial streams and between neighboring TTIs all DL CCs are already done respectively.

HARQ bundling in frequency domain is only performed within preconfigured groups. The configuration of carriers which should be bundled with each other is performed by RRC. The configuration of bundled carriers can apply both for PUCCH and PUSCH feedback. The eNB can choose whether or not to include the primary cell with any other cell in such a group. Further, the eNB can also choose which unlicensed carriers are bundled together and which are not. The reason might be that some of the carriers are in the same band and some are not and it would therefore be more sensible to bundle the carriers that are in the same band.

Alternatively, when the allocated PRBs have enough capacity to carry the Ack/Nack bits, no HARQ Ack/Nack-bundling is used; otherwise, one or more of the above rules is applied for Ack/Nack bundling.

Interaction Between Aperiodic Cs, Reports and Periodic CSI and HARQ-ACK Feedback Aperiodic CSI reports can be requested to be sent on multiple UL carriers. The specific carriers the aperiodic CSI report contains can be differently configured per UL carrier and by that the allowed sets of carrier that the eNB can request aperiodic CSI for is larger. Further, if the eNB schedules PUSCH on multiple carriers in the UL, the UE may continue to use the Rel-10 mapping rules for HARQ-ACK feedback, i.e. the UE would map the HARQ-ACK firstly to the primary cell and then best on serving cell index. Further, if the eNB has request an aperiodic CSI report on only one of the carriers, the UE may still neglect this when selecting the UL carrier to transmit the HARQ-ACK feedback, it can also select UL carrier where the aperiodic CSI report is sent. If multiple UL carriers are requested to report aperiodic CSI reports, the UE may select the UL carrier to report HARQ-ACK based on the above-mentioned rules but without considering the aperiodic CSI feedback. An alternative is that the UE selects the carriers with the lowest cell index (if the primary cell has the value 0).

If the UE is supposed to report both periodic and aperiodic CSI reports for the same cell, the UE do not transmit the periodic CSI feedback. Further, if the UE is requested to report periodic CSI for another cell than the set of cells it is supposed to transmit aperiodic CSI for, the UE does not report the periodic CSI. Alternatively, the UE reports the periodic CSI report, if the UE does not report PUCCH and PUSCH simultaneously, the periodic CSI report is send according to the same rules as HARQ-ACK feedback. If an aperiodic CSI report is sent on the reporting carrier, the periodic CSI report is separately encoded and the encoded bits can be appended to the aperiodic CSI report(s) on that specific cell.

Figure 8:
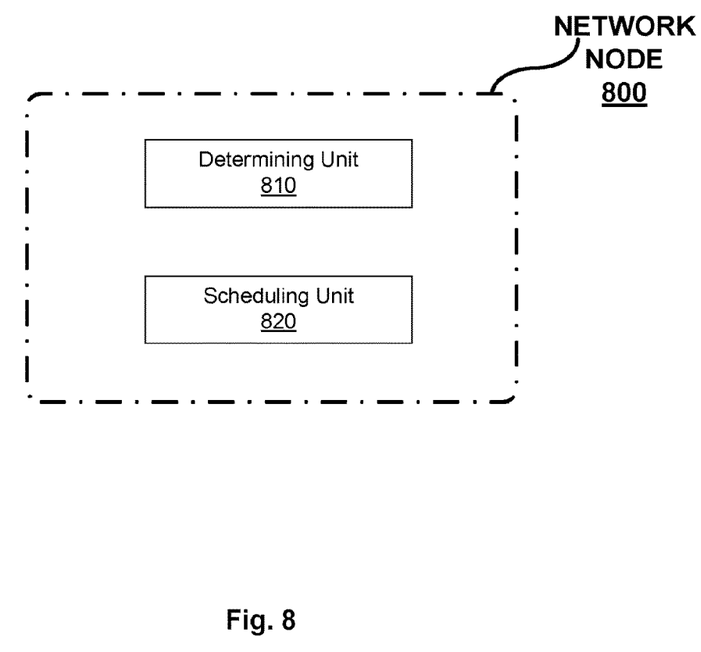
FIG. 8 is a block diagram showing a network node for implementing the proposed solutions according to an embodiment of the present disclosure.

FIG. 8 is a block diagram showing a network node for implementing the proposed solutions according to an embodiment of the present disclosure. As shown in FIG. 8, the network node 800 comprises a determining unit 810 and a scheduling unit 820. The methods described in detail with reference to FIGS. 4-5 can be carried out by the network node 800. For example, the step 410 can be performed by the determining unit 810 and the step 420 can be performed by the scheduling unit 820 respectively. Thus, the details of operations of the network node 800 are omitted here for simplicity.

Figure 9:
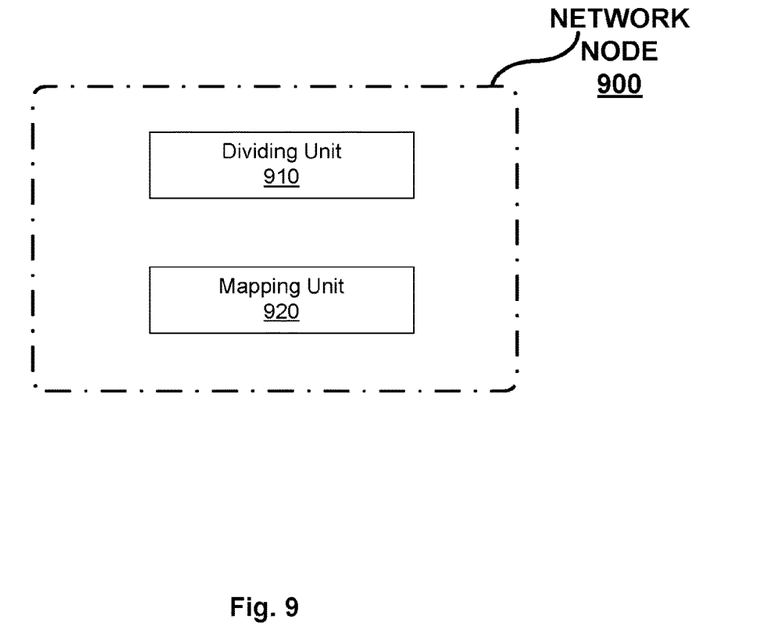
FIG. 9 is a block diagram showing a network node for implementing the proposed solutions according to an embodiment of the present disclosure.

FIG. 9 is a block diagram showing a network node for implementing the proposed solutions according to an embodiment of the present disclosure. As shown in FIG. 9, the network node 900 comprises a dividing unit 910 and a mapping unit 920. The methods described in detail with reference to FIG. 7 can be carried out by the network node 900. For example, the step 710 can be performed by the dividing unit 910 and the step 720 can be performed by the mapping unit 920 respectively. Thus, the details of operations of the network node 900 are omitted here for simplicity.

Figure 10:
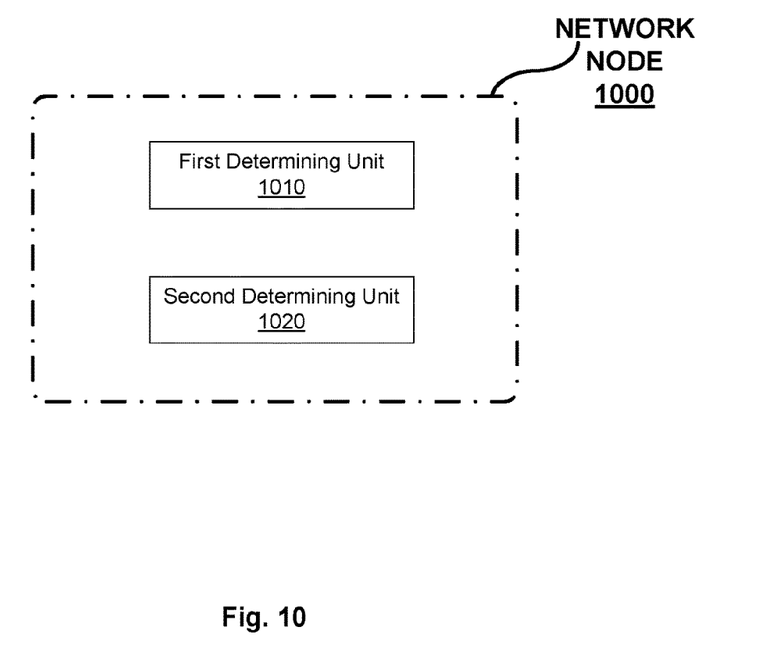
FIG. 10 is a block diagram showing a network node for implementing the proposed solutions according to an embodiment of the present disclosure.

FIG. 10 is a block diagram showing a network node for implementing the proposed solutions according to an embodiment of the present disclosure. As shown in FIG. 10, the network node 1000 comprises a first determining unit 1010 and a second determining unit 1020. The method described in detail with reference to FIG. 6(a) can be carried out by the network node 1000. For example, the step 610a can be performed by the first determining unit 1010 and the step 620a can be performed by the second determining unit 1020 respectively. Thus, the details of operations of the network node 1000 are omitted here for simplicity.

Figure 11:
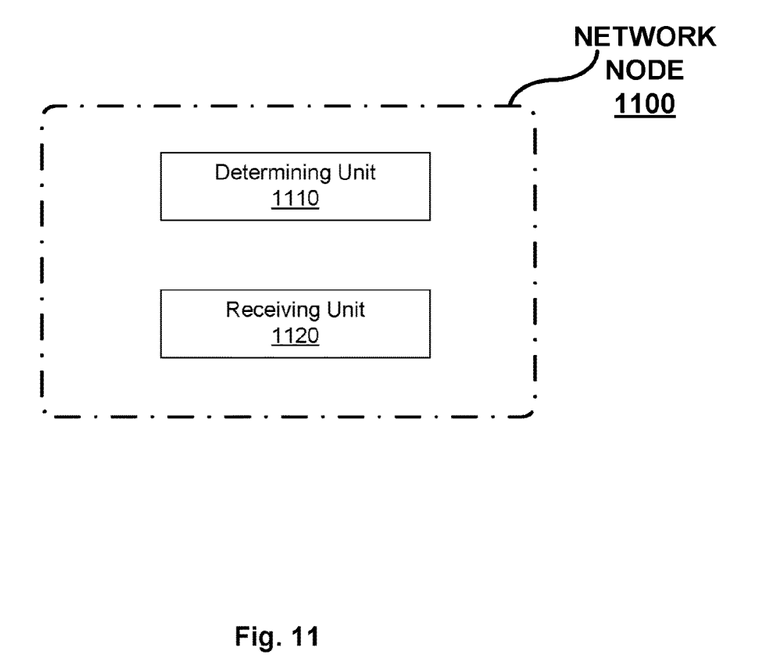
FIG. 11 is a block diagram showing a network node for implementing the proposed solutions according to an embodiment of the present disclosure.

FIG. 11 is a block diagram showing a network node for implementing the proposed solutions according to an embodiment of the present disclosure. As shown in FIG. 11, the network node 1100 comprises a determining unit 1110 and a receiving unit 1120. The method described in detail with reference to FIG. 6(b) can be carried out by the network node 1100. For example, the step 610b can be performed by the determining unit 1110 and the step 620b can be performed by the receiving unit 1120 respectively. Thus, the details of operations of the network node 1100 are omitted here for simplicity.

Figure 12:
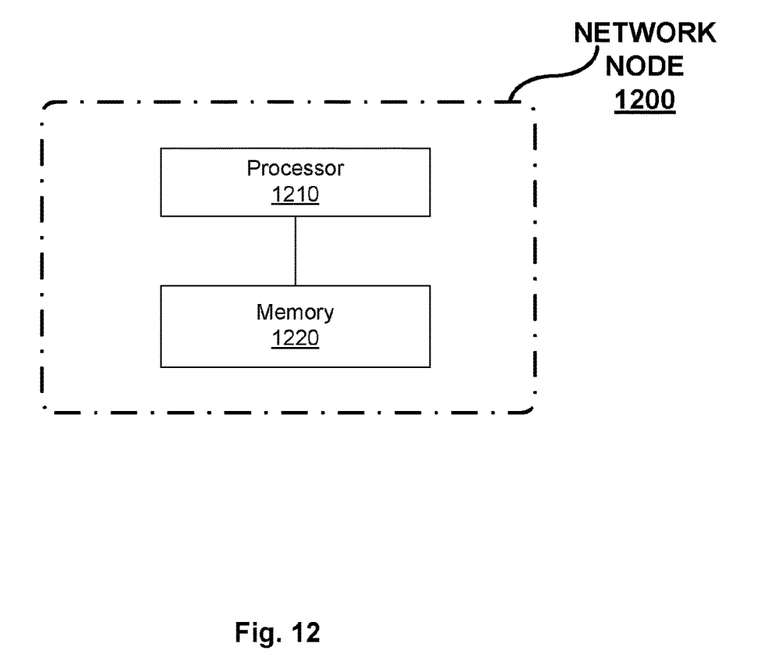
FIG. 12 is a block diagram showing a network node for implementing the proposed solutions according to an embodiment of the present disclosure.

FIG. 12 is a block diagram showing a network node for implementing the proposed solutions according to an embodiment of the present disclosure. As shown in FIG. 12, the network node 1200 comprises a processor 1210 and a memory 1220. The processor 1210 may be a single CPU (Central processing unit), but could also comprise two or more processing units. For example, the processor 1210 may include general purpose microprocessors, instruction set processors and/or related chips sets and/or special purpose microprocessors such as Application Specific Integrated Circuit (ASICs). The memory 1220 contains instructions executable by the processor 1210 whereby the network node 1200 is operative to perform the methods according to the present disclosure. For example, the memory 1220 may be a flash memory, a Random-access memory (RAM), a Read-Only Memory (ROM), or an EEPROM, etc.

In an embodiment of the present disclosure, there is provided a computer program comprising instructions which, when executed on at least one processor, cause the at least one processor to carry out the methods according to according to the present disclosure. The computer program may be carried by a computer program product. The computer program product may comprise a computer readable storage medium on which the computer program is stored. For example, the computer program product may comprise a flash memory, a Random-access memory (RAM), a Read-Only Memory (ROM), or an EEPROM, and the like.

Although the present technology has been described above with reference to specific embodiments, it is not intended to be limited to the specific form set forth herein. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

What is claimed is:

1. A method for transmission of uplink control information, UCI, over a physical uplink shared channels, PUSCHs, the method comprising:
   determining a minimum number of physical resource blocks, PRBs, required for transmission of the UCI, based on the number of downlink component carriers, DL CCs; and
   scheduling at least the minimum number of PRBs for an uplink component carrier, UL CC, to transmit the UCI, wherein scheduling at least the minimum number of PRBs comprises determining a further number of PRBs for data transmission over the UL CC; and if the further number is not smaller than the minimum number, scheduling the further number of PRBs for the UL CC; otherwise, scheduling the minimum number of PRBs for the UL CC.

2. The method according to claim 1, wherein determining a minimum number of PRBs comprises:
   determining a desired code rate for UCI bits based on channel quality and a block error rate, BLER, target; and
   determining the minimum number of PRBs required for transmission of the UCI based on the number of UCI bits and the desired code rate for UCI bits.

* * * * *